(No Model.)
W. DUNDON.
DEVICE FOR CLEANING FLUES, DRAINS, OR PIPES.
No. 492,393. Patented Feb. 28, 1893.
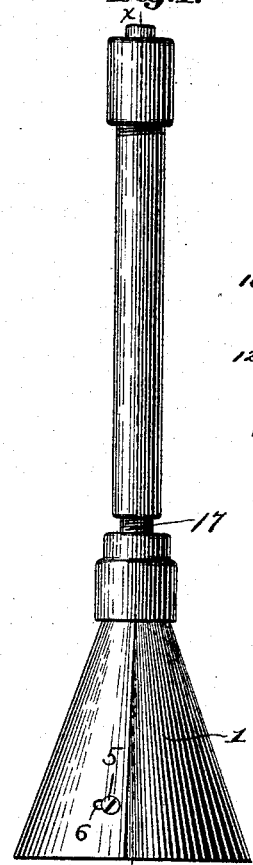
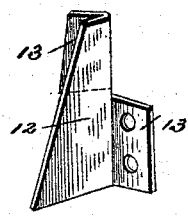
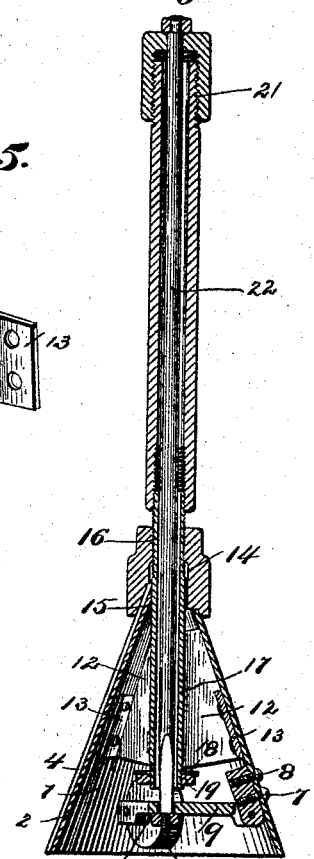
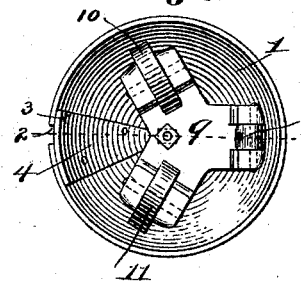
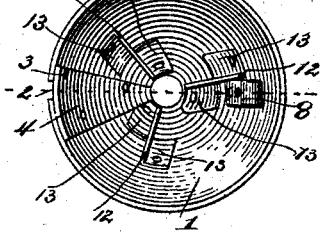
Witnesses:
Cornelius W. Curtan
Peter E. Becker
Inventor:
William Dundon

UNITED STATES PATENT OFFICE.

WILLIAM DUNDON, OF LEAVENWORTH, KANSAS.

DEVICE FOR CLEANING FLUES, DRAINS, OR PIPES.

SPECIFICATION forming part of Letters Patent No. 492,393, dated February 28, 1893.

Application filed April 12, 1892. Serial No. 428,922. (No model.)

*To all whom it may concern:*

Be it known that I, WILLIAM DUNDON, a citizen of the United States, residing at Leavenworth city, in the county of Leavenworth and State of Kansas, have invented a new and useful device for the purpose of cleaning flues, drains, or pipes, but more especially steam-boiler flues, thereby retaining nearer the full power of the heat used, of which the following is a specification.

The object of my invention is to produce a simple, cheap and efficient device for cleaning flues, drains or pipes, and also to make the said device capable of expansion while in a boiler, flue, or pipe, also to allow the expansible part to be set and held at any desired circumference. I attain these objects as hereinafter set forth, pointed out in my claims and illustrated in the accompanying drawings, in which,—

Figure 1. is an elevation of my complete device. Fig. 2. is a bottom view. Fig. 3. is a longitudinal sectional view taken on the line X—X of Fig. 1. Fig. 4. is a view looking into the cone shaped scraper of my device, with a portion removed. Fig. 5. is a detail perspective view of one of the braces in the interior of the cone shaped scraper.

Similar figures refer to similar parts throughout the several views.

The numeral 1 designates the cone shaped scraper, preferably made of steel, and having an opening, or slot, 2, extending its entire length. A metal strip, 3, is fastened on the inner surface of the cone 1, and to one side of the slot, by means of rivets, 4, 4, and to the other side by a screw, 5, passing through a slot, 6, in the cone 1.

Directly opposite the slot 2, and to the lower portion of the cone 1, is fastened, preferably by means of screws, 7, a hinge block, 8, which has hinged to it an approximately tre-foil shaped plate, 9. One of the arms of this plate is engaged in the hinge block, 8, and the other two arms carry small wheels, or rollers, 10 and 11, that bear against the inner lower surface of the cone 1. This cone is also provided with three or more triangular shaped braces, 12, which are so formed as to allow the rear portions, when turned in opposite directions, to form a plate, 13, for riveting them to the cone 1. The cone is fastened at its upper portion to a head, 14, the lower portion of which is bored cone shaped so as to receive the upper portion of the cone 1. This cone shaped bore, 15, terminates in a screw threaded bore 16, which extends through the upper portion of the head 14, and is adapted to receive a short pipe, 17, which at each end is screw threaded on its outer surface. The lower screw threaded end of the pipe 17 receives a washer, 18, and nut, 19, which, when the nut is tightened, bears against the triangular shaped braces, 12, that come in contact with the coupling pipe 17, and thereby serve to hold the cone 1 in a firm and secure position.

To the upper screw threaded portion of the pipe 17, after it passes through the head 14, is screwed a pipe, 20, which serves as the handle of the device. Its upper portion is screw threaded to receive the cap 21.

Running the entire length in the interior of the pipes 17 and 20, is a rod, 22, which is squared at its lower end, and, passing through a square opening in the plate 9, receives a nut 23. Its upper portion passes through the screw cap 21, and there receives a nut, 24. The head 14 is prevented from turning on the pipe 17 by passing a small screw, 25, through the side of the head 14, and into a slot 26 in the coupling pipe 17.

The practical operation of my device is as follows:—When the operator desires to clean a flue, pipe, or drain, the cone, the tendency of which is to contract by reason of the spring and resiliency in the metal of said cone, is inserted in the flue or pipe. Then, by unscrewing the cap 21, the rod 22 will be drawn upward, which will in turn draw the triangular plate 9 toward the smaller end of the cone until the wheels, or rollers, 10, bear against the side of the cone 1, and cause it to enlarge in diameter until it fits the flue, or pipe, it is in. Then, by running the device backward and forward in the usual manner, all soot incrustations, &c., can be easily removed. The strip, 4, entirely closes the slot 2, and thereby forms a complete cutting, or scraping, edge on the cone.

In cleaning boiler flues, or pipes, of all the same diameter, the cone can be set to the proper size by tightening the screw 5. By screwing on extra lengths of the pipe 20 and rod 22, the handle can be easily and quickly lengthened. Should the incrustations in a pipe or drain be of such a nature as to not be easily removed by simply pushing the cone backward and forward, the said cone can be driven in by repeated blows of a hammer on the cap 21.

Having thus described my invention, what I claim as new and useful, and desire to secure by Letters Patent, is—

1. A flue or pipe cleaner, comprising a cone shaped body-portion, an expansion device hinged at one side to the inner side of the cone, and also having radially arranged rollers in its periphery engaging the inner wall of the cone shaped body portion, and a rod extending longitudinally and centrally through the cone shaped head, and longitudinally adjustable therein, and connected at its lower end to the expansion device to actuate the same, substantially as described.

2. In a flue or pipe cleaner, the combination of a cone-shaped body-portion with a pipe exteriorly threaded at its lower end, and extending longitudinally and centrally of said cone-shaped body-portion, and a number of longitudinally arranged braces 12 secured to the inner side of the cone-shaped body-portion, and extending radially inward and bearing against the outer side of the pipe, and a nut 19 and washer 18 engaging the lower threaded end of the pipe, and bearing against the lower end of the radially arranged braces 12, substantially as set forth.

3. In a device for cleaning flues, drains and pipes, the combination of an expansible, conical shaped scraper, provided with a slot in one side, said slot being closed by a strip fastened to one side of said slot, the other side of said strip being held by a screw running through a slot in said cone, said cone shaped scraper being held in a head which head is screwed on a coupling pipe, triangular shaped braces adapted to be screwed to the inner side of said cone and bear against the coupling pipe, a handle screwed to the upper end of said coupling pipe, and having a screw threaded cap, and an expansion device, consisting of a tre-foil shaped plate, hinged to the inner side of the conical scraper and carrying wheels or rollers, and a rod running the entire length of the device, said expansion device capable of being operated by the movements of the cap, all substantially as described, in the manner set forth, and for the purposes stated.

WILLIAM DUNDON.

Witnesses:
JAMES GRAY,
C. FLORA.